US012607285B2

(12) United States Patent
Barthel et al.

(10) Patent No.: US 12,607,285 B2
(45) Date of Patent: Apr. 21, 2026

(54) READABLE COUPLING CONNECTOR AND ITS CONNECTION METHOD

(71) Applicant: TI Automotive (Fuldabrueck) GmbH, Fuldabrueck (DE)

(72) Inventors: Iris Barthel, Schauenburg (DE); Kay Bube, Schenklengsfeld (DE); Reiner Rohde, Malsfeld (DE)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 0 days.

(21) Appl. No.: 18/833,546

(22) PCT Filed: Jan. 26, 2023

(86) PCT No.: PCT/IB2023/050686
§ 371 (c)(1),
(2) Date: Jul. 26, 2024

(87) PCT Pub. No.: WO2023/144749
PCT Pub. Date: Aug. 3, 2023

(65) Prior Publication Data
US 2025/0043895 A1      Feb. 6, 2025

(30) Foreign Application Priority Data

Jan. 26, 2022    (EP) .................................... 22153386

(51) Int. Cl.
*F16L 37/12*          (2006.01)
(52) U.S. Cl.
CPC ....... *F16L 37/1225* (2013.01); *F16L 2201/10* (2013.01)

(58) Field of Classification Search
CPC ... F16L 37/1225; F16L 37/142; F16L 37/144; F16L 2201/10
See application file for complete search history.

(56) References Cited

U.S. PATENT DOCUMENTS

| | | |
|---|---|---|
| 7,244,142 B2 | 7/2007 | Kato |
| 2005/0063125 A1 | 3/2005 | Kato |

(Continued)

FOREIGN PATENT DOCUMENTS

| | | |
|---|---|---|
| EP | 3544114 A1 | 9/2019 |
| EP | 3936752 A1 | 1/2022 |

OTHER PUBLICATIONS

International Search Report for PCT/IB2023/050686 dated Mar. 23, 2023.

*Primary Examiner* — Aaron M Dunwoody
(74) *Attorney, Agent, or Firm* — Dickinson Wright PLLC

(57) ABSTRACT

A coupling connector has a retainer for locking a coupling plug in the connector body. The coupling connector comprises a verifier for indicating a connection state between the coupling connector and the coupling plug. The verifier is movably mounted on the connector body, and indicates the connection state via its position relative to the connector body. The coupling connector comprises a chip, an antenna as well as a switch. The switch has at least one switching contact as well as a closer, wherein the chip, the at least one switching contact and the closer are components of a switching circuit. The coupling connector is designed in such a way that the state of the switching circuit is changed during an insertion of the coupling plug into the connector body. The chip and/or the antenna and/or the at least one switching contact is/are arranged on the verifier and/or on the retainer.

20 Claims, 7 Drawing Sheets

(56) References Cited

U.S. PATENT DOCUMENTS

| | | | | |
|---|---|---|---|---|
| 2020/0309298 A1 * | 10/2020 | Kuhn | .................... | F16L 37/084 |
| 2021/0396336 A1 * | 12/2021 | Schröter | ............. | F16L 37/0841 |

* cited by examiner

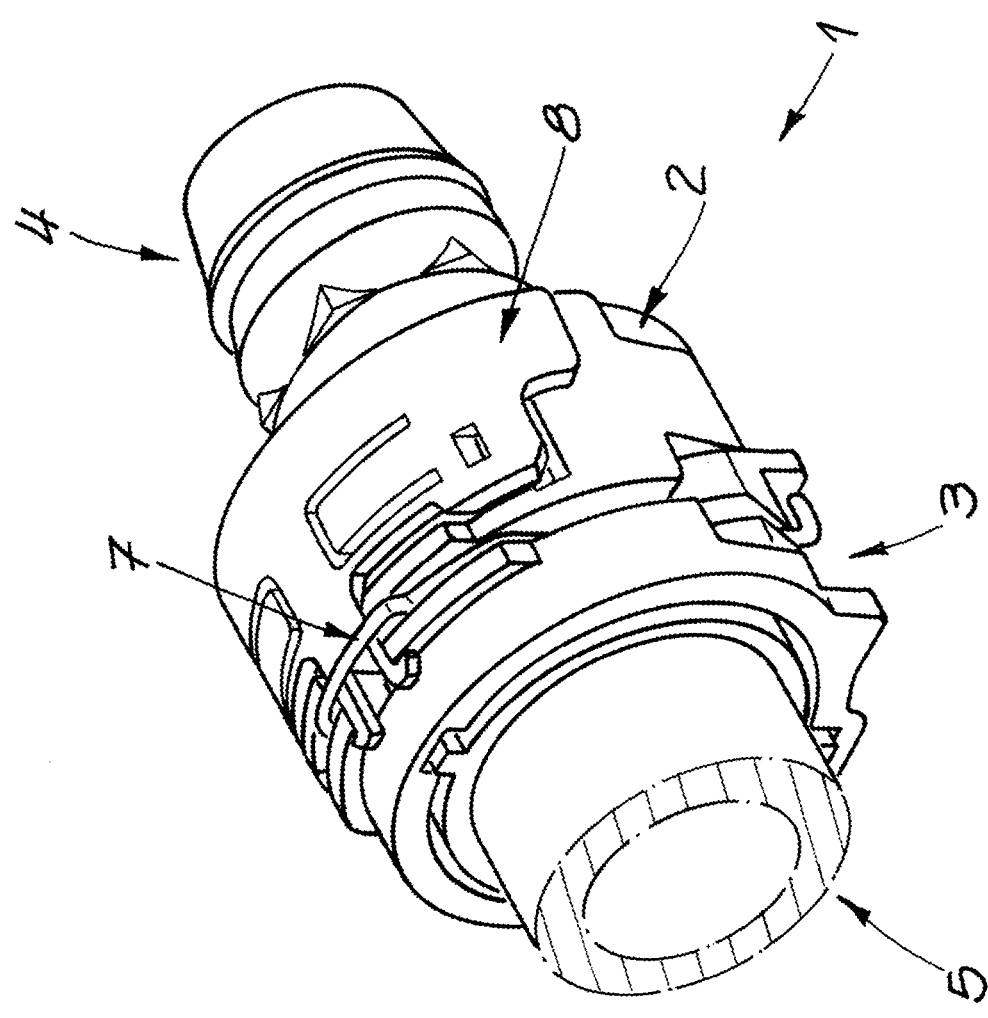
Fig.1

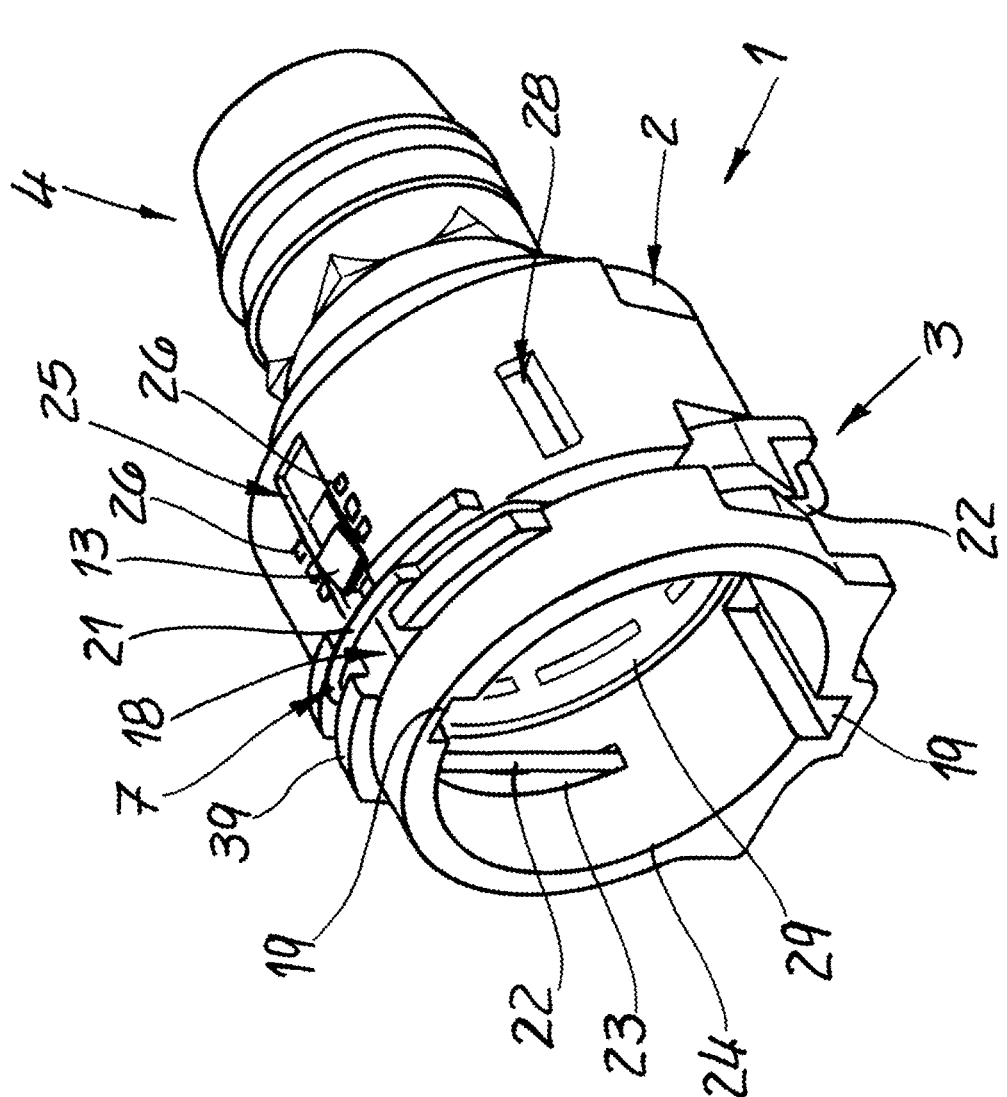

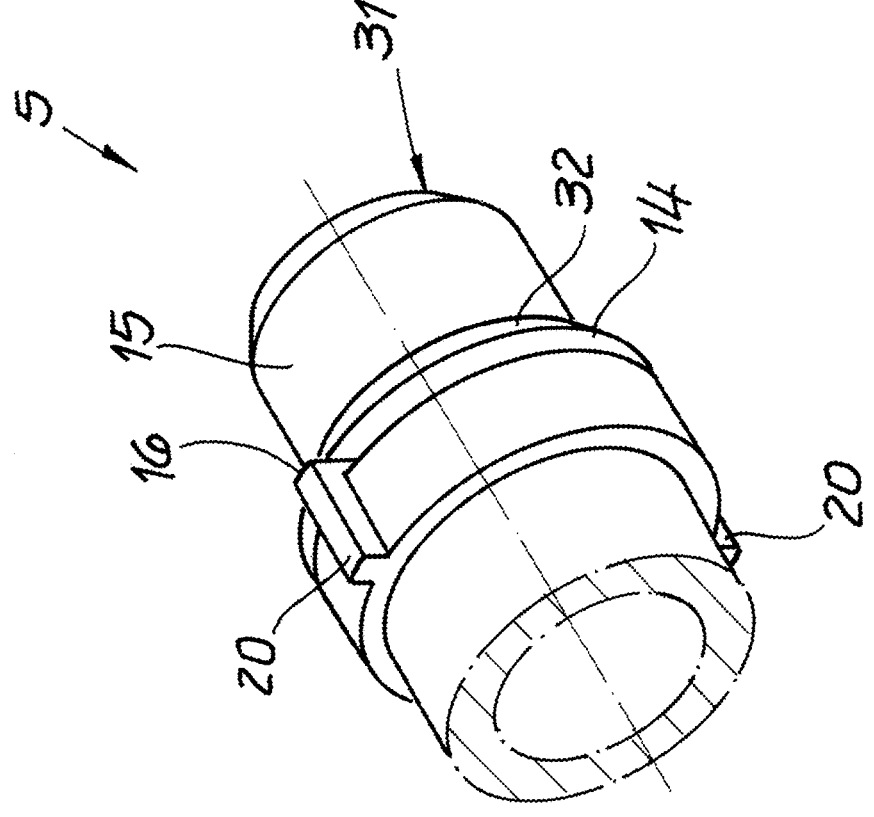

READABLE COUPLING CONNECTOR AND ITS CONNECTION METHOD

RELATED APPLICATIONS

The present disclosure claims priority to and is a national phase application of PCT Application PCT/IB2023/050686, filed Jan. 26, 2023, which claims the benefit of and priority to European Application 22153386.2, filed on Jan. 26, 2022, the entire contents of each of which are incorporated herein by reference.

FIELD

The disclosure relates to a coupling connector according to the preamble of claim 1, as well to a method for connecting a coupling connector and a coupling plug that can be inserted into the coupling connector according to the preamble of claim 15.

BACKGROUND

In a coupling connector known from U.S. Pat. No. 7,244, 142 B2, the retainer is assigned the functions of mounting and simultaneously optically displaying or indicating the connection state. The roughly U-shaped retainer or verifier is provided with an antenna as well as a chip on the exterior side of its U-base, wherein the antenna and the chip are introduced into a label-like element. A projection of the connector body here protrudes in a radial direction through an opening in the U-base of the retainer, and thereby actuates corresponding switching contacts of the transmitter.

The disadvantage to the aforementioned embodiment from U.S. Pat. No. 7,244,142 B2 is that the chip does not store the changed state of the switching circuit. Instead, the open switching circuit ensures that the antenna is nonfunctional, so that a reader can infer from the absence of a transmit signal that the coupling plug is not completely inserted into the connector body. However, there can also be other reasons for the absence of a transmit signal. For example, it can easily happen that the reader only acquires the transmit signal to a slight extent if at all due to the alignment or positioning of the coupling connector and reader relative to each other. The reader would then show a false-negative signal, and the user would erroneously assume that there is no fluidic connection between the coupling plug and the coupling connector. As a result, the user is always unsettled in the event no signal is acquired. The error can then lie in an inadequate mechanical, and hence also fluidic, connection, but also in an unfavorably positioned reader.

This problem is resolved in EP 3 544 114 A1 by virtue of the fact that the state of the switching circuit is stored in the RFID chip, so that the transmit signal actively indicates either an open or a closed fluidic connection. If a transmit signal is not acquired, this always stems from the transmission path of the signal, but not from the open state of the switching circuit or the fluidic connection. The retainer is designed both for mounting the coupling plug in the connector body, and for indicating that the coupling plug is completely mounted. As a consequence, it combines both functions, so that the retainer and the verifier can be equally and simultaneously radially inserted into the connector body. The RFID chip is applied to an exterior side of the connector body along with the antenna and the two switching contacts. By contrast, the closer is fastened to an interior side of the retainer, so that the closer contacts the two switching contacts if the retainer has been completely inserted into the connector body. This contact is detected and stored by the RFID chip, and can later be automatically read out by a reader, so that the connection state not only can be optically detected by the position of the retainer, but automatically electronically acquired as well.

The disadvantage to the coupling connector known from EP 3 544 114 A1 is that the arrangement of the antenna and the switching contacts takes up a relatively large amount of usable surface in an axially middle area of the connector body. The antenna and the switching contacts are located on a label, which is affixed to a larger, middle section of the connector body. However, the label requires a smooth surface of the connector body tailored precisely thereto, so that the label does not put any wrinkles on the connector body. Accordingly, the label imposes numerous structural requirements, so that the connector body can be given a less variable design. For example, fluid coupling systems benefit from the modular principle in that different coupling sections can be combined with different connecting sections. Naturally, the connection between the two sections lies in the middle axial area of the connector body, so that a conflict exists between the flexible modular principle on the one hand and the automated electronic acquisition of the connection state on the other.

SUMMARY

Therefore, the present disclosure provides a coupling connector that is equally compact and flexible in its manufacture, and can automatedly electronically acquire the connection status. The coupling connector preferably can also handle the task of providing an optical and/or haptic display of the connection status.

This is achieved by a coupling connector for automatedly acquiring the coupling state, comprising a connector body with a coupling section and a connecting section, wherein the coupling section is designed to be reversibly detachably connected with a complementary coupling plug, wherein the connecting section is designed to become or be connected with a pipe or aggregate, wherein the coupling section and the connecting section are fluidically connected with each other via an inner channel. The coupling connector preferably comprises a retainer for locking the coupling plug in the connector body, wherein the retainer is movably mounted on the connector body, wherein the coupling connector has a verifier for indicating a connection state between the coupling connector and the coupling plug, wherein the verifier is movably mounted on the connector body, and indicates the connection state via its position relative to the connector body. The coupling connector preferably has a transmitter for transmitting a transmit signal, wherein the transmitter is designed in such a way that the transmit signal can transmit the connection state, wherein the transmitter comprises a chip, an antenna as well as a switch, wherein the switch has at least one switching contact as well as a closer, wherein the chip, the at least one switching contact and the closer are components of a switching circuit. The switching circuit is in an open or in a closed state depending on the position of the closer relative to the at least one switching contact, wherein the coupling connector is designed in such a way that the state of the switching circuit is changed during insertion of the coupling plug into the connector body, wherein the transmitter is designed in such a way that the changed state can be stored in the chip and retrieved by a reader via the transmit signal. The chip and/or the antenna and/or the at least one switching contact is/are arranged on the verifier and/or on the retainer.

It is possible that the retainer and the verifier be components of a multipiece or one-piece, in particular integrally designed combination element. The retainer and the verifier are preferably configured separately from each other. In particular, it is possible that the retainer and the verifier be mounted on the connector body so that they can move at least partially and preferably completely independently of each other, and expediently not be viewed as components of a combination element.

The disclosure is initially based upon the discovery that the closer is comparatively small relative to the aggregate comprised of switching contacts, chip and above all the antenna, so that the relatively small closer only takes up a little space on the surface of the connector body. It was found that, if necessary, the connector body can easily be given a two-part configuration during the arrangement of the chip, the antenna and/or the at least one switching contact on the verifier and/or on the retainer. The disclosure is further based upon the discovery that the verifier or retainer can be designed in such a way that it can accommodate, and preferably also protect, the switching contacts, the chip and the antenna.

In particular, it was found that the advantages of arranging the chip, the antenna and/or the at least one switching contact on the verifier and/or on the retainer outweigh the disadvantages associated therewith. The inventive arrangement does require a larger verifier/retainer, because the verifier/retainer accommodates the switching contacts, the chip, and the antenna. However, the disclosure is further based upon the knowledge that the large volume of the verifier/retainer need not lead to a correspondingly larger volume of the coupling connector, because above all the surface provided for the electronic components is relevant in the case of the verifier/retainer. The verifier/retainer can thus provide a large surface without at the same time decisively enlarging the volume of the coupling connector in the process, which as a rule is undesired in the automotive field. For this reason, the coupling connector is both compact in design, flexible to manufacture, and further offers the ability to automatedly and reliably electronically acquire the connection state. The object mentioned at the outset is thus resolved.

The term "axial" is preferably related to installation parts, and in particular relates to the coupling connector or to the coupling plug. The word "axial" preferably refers to the centerline direction of the coupling section of the coupling connector. In relation to the coupling plug, the term "axial" preferably refers to the centerline direction of the sealing surface section of the coupling plug. The term "axial" can also mean a centerline direction of the connecting section of the coupling connector, if it relates thereto. If the coupling connector has an angled configuration, the axial direction of the connecting section is unequal to that of the coupling section.

The expression "axially inward" preferably refers to the axial direction proceeding from the coupling opening of the coupling connector in the direction of an axial middle section of the coupling connector or proceeding from a/the plug opening of the coupling plug in the direction of an axial middle section of the coupling plug.

The term "radial" preferably relates to the respective axial direction. In a longitudinal section (middle axis preferably lies in the image plane) of the component, the radial direction is preferably aligned perpendicular to the axial direction. The expression "circumferential direction" expediently refers to the axis or axial direction that underlies it.

It is preferred that the connecting section be designed to be connected with a pipe or tube. In particular, the connecting section can be frictionally and/or materially connected to the pipe. For example, a frictional connection can be achieved via a press fit of the pipe on the connecting section or in the connecting section. It is possible for the pipe to be materially connected with the connecting section via welding. For example, the welding method can involve laser welding and friction welding. According to a preferred embodiment, the pipe is inserted into the connecting section, and preferably materially connected with the latter via laser welding. It is possible for the connecting section of the coupling connector to be integrally connected with an aggregate. It is possible to manufacture the aggregate or a part of the aggregate together with the coupling connector via injection molding. For example, the aggregate can be a tank, a pump, a nozzle or the like. According to a preferred embodiment, the coupling connector is a separately manufactured component, so that the connection with the pipe or the aggregate is preferably only established later.

The coupling plug is preferably a separately manufactured component. It is preferred that the coupling plug have a terminal section to be hooked up to a pipe or an aggregate. In particular, the hookup to the pipe or the aggregate can be frictional and/or material in design. It is possible that the coupling plug be integrally connected with the aggregate. For example, the aggregate or a part of the aggregate can be manufactured together with the coupling plug via injection molding. It is preferred that the pipe be frictionally inserted into the terminal section or plugged onto the terminal section. The pipe or the aggregate are advantageously materially connected with the coupling plug or with the terminal section, in particular via welding. Welding can advantageously be performed via laser welding or friction welding.

The term "switching contact" preferably means an electrically conductive element that can be brought into reversible electrical contact with the closer. The switching contact or the switching contacts can each be designed as contact strips. The switching contact preferably comprises at least one contact point. The closer expediently comprises at least one contact point, and preferably two contact points, which come into electrical contact with the contact point of the switching contact or the contact points of the switching contacts during closure of the switching circuit. The antenna is expediently electrically connected with the chip.

According to a preferred embodiment, the retainer and the verifier are separately designed parts, which preferably have different directions of movement during displacement on the connector body. It is preferred that the retainer be insertable into the connector body in a radial direction. It is preferred that the retainer be at least sectionally arranged radially outside of the verifier in a longitudinal section of the coupling connector and in a state where completely inserted into the connector body. At least one section of one of the handling sections is especially preferably arranged radially outside of the verifier. The advantage of this arrangement lies in an especially well designable decoupling of the directions of movement of the retainer on the one hand, as well as of the verifier on the other. The retainer is preferably U-shaped in its basic shape. It is possible that the retainer be annularly designed in its basic shape. According to an embodiment, the retainer can be radially expanded by the coupling plug. According to one embodiment, the retainer comprises a metal. According to another embodiment, the retainer has a plastic. The retainer is preferably a single piece, and further preferably integral in design. The retainer advantageously has a U-base or a handling section on the one hand, as well as two latching arms on the other. According to a preferred exemplary embodiment, the handling section is mounted between two flanges on an exterior side of the connector body. It is preferred that the two latching arms of the retainer each be located in a latching arm window of the connector body in an inserted state of the retainer.

It is advantageous that the verifier comprises plastic. It is preferred that the verifier be manufactured separately from the retainer via injection molding. The retainer and the verifier can especially preferably be reversibly removed from the connector body. The expression "reversible removal" preferably means nondestructive removal. It is advantageous that the retainer and/or the verifier be reversibly attachable to the connector body. It is possible that the retainer and the verifier form a multipiece or one-piece—in particular an integral one-piece-combination element.

The retainer is preferably elastically deformable in design for latching on a locking element of the coupling plug. For example, the locking element of the coupling plug can be a shoulder, a groove or a-preferably continuous-collar. It is especially preferred that the retainer be designed in such a way that the retainer stores reset energy during insertion of the coupling plug into the connector body. The retainer is preferably designed in such a way that the retainer releases the stored reset energy and latches on the locking element of the coupling plug once the locking element of the coupling plug has reached the retainer or the latching arms in an axial direction. It is preferred that the retainer be reversibly detachable from the locking element or the coupling plug. This yields an especially fast and comfortable mechanical connection between the coupling plug and connector.

It is advantageous that the closer have a movable, and preferably spring-elastic, design. As a result, the switching contacts need not be elastic in design, which leads to a somewhat greater stability of the switch. According to an especially preferred embodiment, the closer is designed as a leaf spring. The closer preferably comprises a metal. The closer advantageously preferably comprises a section attached to the connector body as well as a section protruding from the connector body. It is advantageous that the section of the closer protruding from the connector body be obliquely aligned to the middle axis of the coupling section in a side view of the connector body. It is preferred that the section protruding from the connector body at least sectionally run obliquely radially outward in a side view of the connector body in an axially inward direction.

According to a especially preferred embodiment, the verifier is axially movably mounted on the connector body in a connection state of the coupling connector not connected with the coupling plug. The verifier or the connector body is preferably designed in such a way that the verifier can assume at least one axially outward position and an axially inward position. It is especially preferred that the coupling connector be designed in such a way that the state of the switching circuit is-preferably reversibly-changed by transferring the verifier from the axially outward position into the axially inward position. It is preferred that the coupling connector be designed in such a way that the state of the switching circuit is changed during a transfer of the verifier from the axially inward position into the axially outward position. It is especially preferred that the coupling connector be designed in such a way that the verifier opens the switching circuit during a transfer from the axially outward position into the axially inward position.

It is advantageous that the coupling connector be designed in such a way that a/the axially outward position and/or a/the axially inward position is/becomes defined by at least one position element of the connector body and/or by at least one position part of the verifier. It is preferred that the axially outward position and/or the axially inward position of the verifier is/be defined through latching the position part of the verifier to the position element of the connector body. The at least one position part of the verifier advantageously protrudes radially inward. The at least one position part can engage into at least one position element of the connector body and preferably latch into it. A respective position element on the connector body is preferably allocated to the axially outer position and/or the axially inward position. It is preferred that the verifier have two position parts, to which a respective position element on the connector body is allocated in the axially outward position and/or in the axially inward position. It is preferred that the position element or the position elements be designed complementary to the position part or the position parts. According to a preferred embodiment, the position element/the position elements is/are designed as recesses complementary to the protruding position part or position parts.

According to a preferred design, the at least one switching contact and/or the chip and/or the antenna is/are arranged or fastened on a side of the verifier or retainer that faces the connector body. As a result, the transmitter is better protected against the environment of the coupling connector. Another advantage to this arrangement lies in the fact that the elements of the transmitter that are fastened to the verifier can be easily fastened to the verifier, for example through adhesive bonding. For example, if parts of the transmitter were to be arranged on an exterior side of the verifier, at least the switching contacts would have to engage through the verifier in a radial direction in order to contact a closer preferably fastened to the connector body. As a consequence, the switching contacts would already have to be embedded into the verifier during the injection molding process, which would be a complicated endeavor. It is preferred that the at least one switching contact and/or the chip and/or the antenna not be visible in a mounted state of the verifier on the connector body in a top view and/or in a side view of the verifier or the coupling connector.

According to a preferred embodiment, the verifier is predominantly arranged on an exterior side of the connector body. As a result, the verifier can also be actuated by hand. It is especially preferred that the coupling connector be designed in such a way that the verifier be visible from outside with the naked eye, and preferably have a different color than the connector body. In a preferred design, the verifier partially axially sectionally envelops the connector body in an orbital direction, and preferably only partially. It is possible that the verifier envelop the connector body in an orbital direction by at most 270°, or 225°, or 180°. It is advantageous that an axial expansion of the verifier correspond to at most ¾ or ⅔ or half of the axial expansion of the connector body.

It is preferred that the verifier can assume at least two, and preferably at least three, defined positions relative to the connector body. The positions can be defined via a respective stop or press fixation, and in particular by means of latching points. It is preferred that the verifier can assume a/the axially outward position and a/the axially inward position relative to the connector body. The verifier can preferably assume a middle position relative to the connector body that is located between the axially outward position and the axially inward position. The coupling connector is advantageously designed in such a way that the state of the switching circuit is changed via a transfer from the axially outward position into the middle position. It is preferred that the coupling connector be designed in such a way that the state of the switching circuit not be changed from the middle position into the axially inward position.

It is advantageous that the coupling connector be designed in such a way that the coupling plug transfer the verifier from a/the axially outward position into the axially inward or middle position during an insertion into the connector body. It is possible that the coupling connector be designed in such a way that the coupling plug cannot transfer the verifier from the middle position into a/the axially inward position. The coupling connector is advantageously designed in such a way that the verifier can be transferred, and in particular reversibly transferred, from the axially outward or middle position into the axially inward position manually or by hand.

The advantage to providing three defined positions is that the complete insertion of the coupling plug can also be verified haptically. Before the coupling plug is introduced, a user can haptically determine, in particular through actuation by hand, that the verifier can be reversibly displaced into all three defined positions. If the coupling plug is now introduced into the connector body, the verifier is transferred from the axially outward position into the middle position, while the coupling plug simultaneously latches into the connector body. In the latched state of the coupling plug, the verifier can then be displaced from the middle position into the axial inward position and back again. However, because the coupling plug is latched into the connector body, the retainer can no longer be used to displace the verifier from the middle position into the axially outward position. As a consequence, the connection state between the coupling plug and coupling connector can be haptically verified by manually displacing the verifier. It is preferred that the switching circuit be located in the middle position in an open state, so that the state of the switching circuit is preferably not changed by the transfer from the middle position into the axially inward position. The three defined positions are preferably defined via at least three position elements on the connector body, which are made to engage with at least one position part on the verifier. The engagement by the at least one position part into the three position elements is advantageously designed as a latching engagement.

According to a preferred embodiment, the connector body has at least one guide part and preferably two guide parts for guiding the verifier. The verifier advantageously comprises at least one guide element, and preferably two guide elements. The at least one guide element of the verifier is expediently engaged with the at least one guide part of the connector body in such a way as to thereby define a—preferably axial—direction of movement of the verifier on the connector body. It is possible that the guide element of the verifier and the guide part of the connector body determine an axial expansion of the travel path of the verifier. The at least one guide part of the connector body or the at least one guide element of the verifier is advantageously designed as a groove, whose longitudinal expansion extends in an axial direction, while the respective other element is designed as a nose that engages into the groove.

According to a recommended embodiment, the verifier comprises an actuating section, wherein the coupling connector or the verifier is/are preferably designed in such a way that the coupling plug touches the actuating section during insertion into the connector body. The advantage to this arrangement is that the transmission of information about the connection status is transferred directly from the coupling plug to the verifier, so that the verifier can be given a comparatively simple and simultaneously robust design. A further advantage to this design is that the transfer of the coupling plug into the connection state is simultaneously accompanied by a transfer of the verifier as well as a change in the state of the switching circuit, eliminating the need to separately actuate the verifier. A single connection movement between the coupling plug and coupling connector is thus able to set the entire coupling arrangement to an operational state, which can simultaneously be electronically read as well as optically and haptically verified. The coupling connector is especially preferably designed in such a way that the coupling plug takes along the verifier over at least an axial section during insertion into the connector body. According to one embodiment, the actuation section of the verifier is a radially inwardly protruding nose.

It is preferred that the coupling plug have an actuating element, which comes into contact with the actuating section of the verifier during the insertion of the coupling plug into the connector body. It is advantageous that the coupling connector be designed in such a way that the actuating element of the coupling plug displaces the verifier from the axially outward position into the middle position or into the axially inward position during the insertion of the coupling plug. The actuating element of the coupling plug is preferably a projection that protrudes radially outwardly in relation to a sealing surface. According to an embodiment, the actuating element can be a front face of a securing part of a coupling plug. The securing part of the coupling plug preferably serves to secure the coupling plug against twisting in the connector body. It is possible that the actuating element of the coupling plug correspond to a front face of a/the circumferential collar of the coupling plug. The actuating element can further be a groove of the coupling plug, into which the actuating section of the verifier engages.

The connector body preferably comprises an actuating recess, in particular in the form of a radially continuous groove or a window, so that the coupling plug or the actuating element preferably touches or takes along the verifier or the actuating section during complete insertion into the connector body. In particular, the expression "window" refers to a circumferential edge of the actuating recess formed by the wall of the connector body in a top view of the connector body. The word "groove" preferably means that the actuating recess is open in the area of a/the coupling opening of the connector body, so that the actuating recess has a roughly U-shaped outline in the form of a groove in the top view of the connector body. The actuating recess is expediently designed in such a way that the actuating section of the verifier can engage through the wall of the connector body, so as to come into contact with the coupling plug or the actuating element of the coupling plug. The expansion of the actuating recess in the circumferential direction expediently corresponds to at least the expansion of the actuating recess in the circumferential direction. It is preferred that an axial expansion of the actuating recess correspond to at least the travel path of the actuating section of the verifier between the axially outward position and the axially inward position.

According to a possible embodiment, the coupling connector is designed in such a way that the switching circuit is disconnected with the coupling plug completely inserted into the connector body. As a result, the antenna and/or the chip can be arranged in an axially inward half of the verifier. At least one contact point of the closer is thus expediently arranged between a front face of the actuating section facing axially outward and the antenna, preferably in the axially outward position and/or the axially inward position and/or the middle position. As a result, the antenna is situated as far away from the retainer as possible, which can also comprise a metal. As a consequence of this arrangement, fewer interference fields of the metallic retainer interfere with the transmit signal of the antenna. It is preferred that the antenna be arranged in an axially inward third or in the axially inward half of the verifier. The chip and/or the antenna is/are preferably arranged axially inward relative to the at least one switching contact on the verifier. It is advantageous that the coupling connector be designed in such a way that the verifier can assume two, and further preferably precisely two, defined axial positions.

It is possible that the coupling connector be designed in such a way that the switching circuit is closed with the coupling plug completely inserted into the connector body. As a result, the normal state of the switching circuit is closed, so that the at least one switching contact and the closer touch each other in a normal state, thereby reducing corrosive influences. The chip and/or the antenna is/are advantageously arranged axially outwardly on the verifier relative to the at least one switching contact. The coupling connector is preferably designed in such a way that the verifier can assume at least three defined positions relative to the connector body.

It is preferred that the connector body have at least one securing element to secure the coupling plug against twisting in the connector body.

The connector body advantageously corresponds to the VDA guideline, and for example has a nominal width NW (inner diameter of the coupling plug) of 8, 12, 16, 20, 26, 32, 40 or 50 mm. The at least one securing element advantageously corresponds to a groovelike depression on an interior side of the connector body in the area of the coupling section. The securing element is expediently expanded in an axial direction in such a way that a complementary, spring-like securing part of the coupling plug engages into the securing element during the insertion of the coupling plug into the connector body. The securing part of the coupling plug and the securing element of the connector body expediently enter into a tongue-and-groove connection. It is preferred that the connector body comprise two securing elements. The two securing elements are preferably arranged diametrically opposite each other relative to the middle axis of the coupling section. The securing element or the securing elements is/are expediently located in the coupling section of the connector body. According to a preferred embodiment, the actuating recess transitions into the securing element in an axially outward direction. In the case of a VDA design, it is preferred that the actuating recess both assume the function of the securing element and also enable the function of actuating the verifier.

According to a preferred embodiment, the switch has two switching contacts. A contact point is preferably allocated to each of the two switching contacts. The coupling connector is expediently designed in such a way that the closer contacts both switching contacts or contact points in a closed state of the switching circuit, and thereby preferably short circuits the two switching contacts. The closer expediently has two contact points, wherein each of these two contact points expediently contacts a respective contact point of one of the two switching contacts. The closer can be arranged on the connector body or on the verifier or retainer. If the closer is arranged on the verifier/retainer, the connector body comprises a pressure element for pressing the closer in the direction of a switching contact for contacting purposes. If the closer is located on the connector body, the verifier is preferably designed in such a way that the closer touches both switching contacts, preferably simultaneously, during a transfer of the coupling plug into the connection state. It is preferred that the two switching contacts each be designed as oblong contact strips, in particular as equally long contact strips.

It is advantageous that the verifier at least partially, and preferably completely, cover the closer in at least one axial position, and preferably in all axial positions. This provides protection to the switching circuit. According to a possible design, the closer is arranged or fastened on the connector body. The closer expediently comprises a fastening section for fastening the closer on the connector body, and a contacting section for contacting the switching contact or the switching contacts. It is preferred that the connector body comprise a closer receptacle for receiving the closer. The closer receptacle is advantageously designed as a groove on an exterior side of the connector body. In a mounted state on the connector body, the verifier preferably covers the closer receptacles at least sectionally in the axially outward position and/or the axially inward position and/or the middle position of the verifier. It is highly recommended that the closer not be visible in any position of the verifier on the connector body. The closer advantageously contacts the switching contact or the switching contacts, which is/are arranged on an interior side of the verifier. It is possible that the fastening section of the closer be clamped or cast in the closer receptacle. It is preferred that the contacting section of the closer be obliquely aligned to the middle axis of the coupling section in a side view of the connector body or in a longitudinal section of the connector body. The contacting section advantageously extends obliquely to the middle axis of the coupling section in the longitudinal section of the connector body, and radially outward in an axially inward direction.

The object or objects mentioned at the outset are achieved by a coupling arrangement comprising a coupling connector—in particular a coupling connector according to the disclosure—and a coupling plug that can be inserted into the coupling connector, wherein the coupling connector comprises a connector body with a coupling section and a connecting section, wherein the coupling connector is designed to be reversibly detachably connected with the coupling plug, wherein the connecting section is designed to become connected or to be connected with a pipe or aggregate, wherein the coupling section and the connecting section are fluidically connected with each other via an inner channel. The coupling connector comprises a retainer for locking the coupling plug in the connector body, wherein the retainer is movably mounted on the connector body, wherein the coupling connector has a verifier for indicating a connection state between the coupling plug and the coupling connector, wherein the verifier is movably mounted on the connector body, and indicates the connection state via its position relative to the connector body, wherein the verifier is arranged on an exterior side of the connector body. The coupling connector and the coupling plug are designed in such a way that an actuating element of the coupling plug hits against an actuating section of the verifier during the insertion of the coupling plug into the connector body, so that the verifier is displaced axially inward relative to the connector body during a continued insertion of the coupling plug.

It is recommended that the coupling plug have a locking element, wherein the locking element is preferably designed in such a way as to latch with the retainer during the insertion of the coupling plug into the connector body. The coupling plug advantageously comprises a sealing surface, wherein the sealing surface is preferably located axially outward from the locking element. During the insertion of the coupling plug into the connector body, the sealing surface advantageously enters into a fluid-tight contact with a/the seal. The actuating element expediently protrudes radially in relation to the sealing surface. The coupling plug can have a conical section, which advantageously is located between the locking element and the sealing surface. The conical section is preferably designed in such a way that it spreads open the retainer or the latching arms of the retainer during an insertion of the coupling plug into the connector body. The coupling plug preferably corresponds to the VDA guideline for fluid couplings.

The coupling plug advantageously comprises a terminal section, wherein the locking element is preferably arranged between the sealing surface and the terminal section. It is preferred that the coupling plug comprise a middle section. The middle section is expediently located between the terminal section and the sealing surface, and advantageously comprises the locking element. It is preferred that the sealing surface of the coupling plug be cylindrical in design, at least in terms of spacing [sic].

The coupling connector expediently comprises a seal for fluid-tight connection with the coupling plug. The seal advantageously has an elastically designed sealing ring, and preferably a seal holder. The seal holder advantageously fixes the sealing ring in the connector body in such a way that the sealing ring cannot fall out of the connector body in an axially outward direction. For example, the seal holder can be annular in design, and can advantageously be latched into the connector body. It is preferred that the sealing surface of the coupling plug be designed complementary to the seal or to the sealing ring. The sealing ring in connection with the sealing surface of the coupling plug expediently generates a frictional connection to establish a fluid-tight seal for the coupling arrangement.

The object/objects mentioned at the outset is/are achieved by the use of the coupling connector according to the disclosure or the coupling arrangement according to the disclosure in a motor vehicle.

The object/objects mentioned at the outset is/are achieved by a method for connecting a coupling connector—in particular a coupling connector according to the disclosure— and a coupling plug that can be inserted into the coupling connector, wherein the coupling connector comprises a connector body with a coupling section and a connecting section, wherein the coupling section is designed to be reversibly detachably connected with the coupling plug, wherein the connecting section is designed to become connected or be connected with a pipe or aggregate, wherein the coupling section and the connecting section are fluidically connected with each other via an inner channel. The coupling connector comprises a retainer for locking the coupling plug into the connector body, wherein the retainer is movably mounted on the connector body, wherein the coupling connector has a verifier for indicating a connection state between the coupling plug and the coupling connector, wherein the verifier is movably mounted on the connector body and displays the connection state via its position relative to the connector body, wherein the verifier is arranged on an exterior side of the connector body. The coupling connector and the coupling plug are designed in such a way that the actuating element of the coupling plug hits against an actuating section of the verifier during the insertion of the coupling plug into the connector body, so that the verifier is displaced axially inward relative to the connector body during a continued insertion of the coupling plug.

BRIEF DESCRIPTION OF THE DRAWINGS

The disclosure is described in the following figures based upon an exemplary embodiment. Shown on:

FIG. 1 is a perspective view of a coupling arrangement according to the disclosure with a coupling connector and a coupling plug in a completely connected state, FIG. 2 is a perspective view of the coupling connector on FIG. 1, but without a verifier, FIG. 3 is a perspective view of the coupling plug on FIG. 1.

DETAILED DESCRIPTION

Figure 4B:
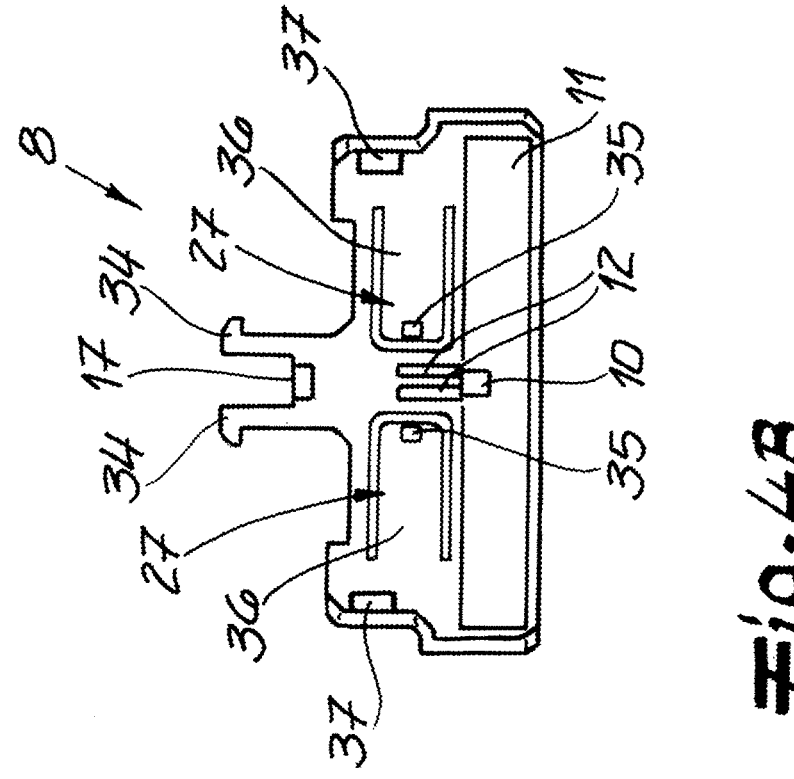
FIG. 4B is a view of the interior side of the verifier on FIG. 4A.

FIG. 1 shows a coupling arrangement 1, 5 according to the disclosure, which comprises a coupling connector 1 as well as a coupling plug 5. The coupling plug 5 is only shown incompletely on this figure and on subsequent figures. In particular, it is missing an end of the coupling plug located further axially inward with a receptacle for a fluid pipe or tube. For example, the receptacle can be designed in such a way that the fluid pipe can be inserted into the receptacle of the coupling plug, and there be connected with the coupling plug 5 via welding, in particular via laser welding. Instead, FIGS. 1, 3 as well as 5 to 7 always show a coupling plug 5, which is shown cut in an axially inward direction, and hence at the left end, for the sake of simplicity.

According to the disclosure, the coupling connector 1 according to FIG. 1 comprises a connector body 2, a retainer 7 as well as a verifier 8. In this exemplary embodiment, the retainer 7 and the verifier 8 are designed as separate elements. It is possible that the retainer 7 be designed as roughly a U-shaped wire bracket. While the coupling connector 1 is preferably designed like a VDA connector, the disclosure also comprises SAE embodiments not depicted here. According to FIG. 1, the connector body 2 has a coupling section 3 as well as a connecting section 4. The coupling section 3 is designed to be reversibly detachably connected with the coupling plug 5. The connecting section 4 is designed to be connected with a pipe or aggregate not shown here.

It is also possible that the connecting section 4 form a one-piece or integral connection with a pipe or aggregate. As a consequence, the connecting section 4 can also be designed as a connection that can only be destructively detached, but the latter is not shown here. The coupling plug 5 can also be connected with an aggregate not shown here, and have been manufactured together with at least one section of this aggregate in an injection mold. Typical fields of application for the coupling arrangements 1, 5 according to the disclosure include in particular fluid-conveying systems inside of motor vehicles.

Showing the coupling connector 1 without the verifier 8 allows an upper side of the connector body 2 to be viewed on FIG. 2. A closer 13 is preferably located in a closer receptacle 25 of the connector body 2. The closer 13 in this exemplary embodiment is made out of metal, and preferably designed like a leaf spring. The leaf spring preferably comprises a section placed in the closer receptacle 25, as well as a section angled relative thereto that protrudes upwardly. In a longitudinal section of the connector body 2, the angled leg of the closer 13 advantageously rises obliquely upward in an axially inward direction.

It is preferred that the connector body 2 have at least two, and preferably at least three, position elements 26, for example in the form of latching recesses. The position elements are expediently arranged one after the other in an axial direction, and preferably located on an exterior side of the connector body 2. It is possible that an additional, accompanying position element 26 be allocated to each of the position elements 26 on the connector body 2 at the same axial height. In a top view of the connector body 2, several of the position elements 26 are advantageously arranged on one side of the closer 13, while the other position elements 26 are located on the other side of the closer 13.

It is advantageous that the connector body has at least one guide part 28 for guiding the verifier 8. The connector body 2 expediently comprises at least two guide parts 28, which in a top view are symmetrically arranged relative to a longitudinal axis of the coupling section 3. For example, the at least one guide part 28 can be designed as a depression or as a projection. It is especially preferable that the axial expansion of the guide part/of the guide parts correspond to at least the distance of the position elements 26 lying axially the furthest apart or the axial travel path of the verifier 8.

It is preferred that the connector body 2 comprise an activating recess 18. The activating recess 18 is preferably continuous in a radial direction, so that it establishes a connection between an interior and an exterior of the connector body 2. In a top view of the connector body 2, the activating recess can be designed circumferentially or as a window. It is possible that the activating recess 18 extend up to an axially outward end of the connector body 2, and hence up to a coupling opening 24 of the connector opening 2, so that the activating recess 18 is designed as a groove.

The embodiment of the coupling connector 1 in the form of a VDA quick connector preferably comprises two flanges in the area of the retainer 7 that are sequential in an axial direction. It is possible that one of the flanges, preferably the axially more outward flange, form a stop 39 for the verifier 8, which will be touched upon in even more detail below. The retainer 7 in this exemplary embodiment has a handling section 21 as well as preferably two latching arms 22. It is preferred that the handling section 21 correspond to the U-base of the retainer 7. The two latching arms 22 advantageously constitute the U-legs of the U-shaped retainer 7. It is possible that the ends of the latching arms 22 extend in an axial direction, as made evident on FIG. 2.

The expansion of the two flanges in the circumferential direction preferably corresponds to roughly the expansion in the circumferential direction of the handling section 21. The handling section 21 is expediently at least sectionally arranged in an axial direction between the two flanges. In a front view of the coupling connector 1 or the connector body 2, it is possible that the handling section 21 of the retainer 7 has a section that is elevated in the radial direction and preferably located in the middle of the U-base. In particular, the elevated section can be used for actuation by hand or by means of a tool. The latching arms 22 are preferably located in latching arm windows 23 of the connector body 2 when the retainer 7 is in a completely inserted position inside of the connector body 2. It is possible that the connector body 2 defines an only partially inserted position of the retainer 7, for example via corresponding latching receptacles or latching projections.

Figure 5:
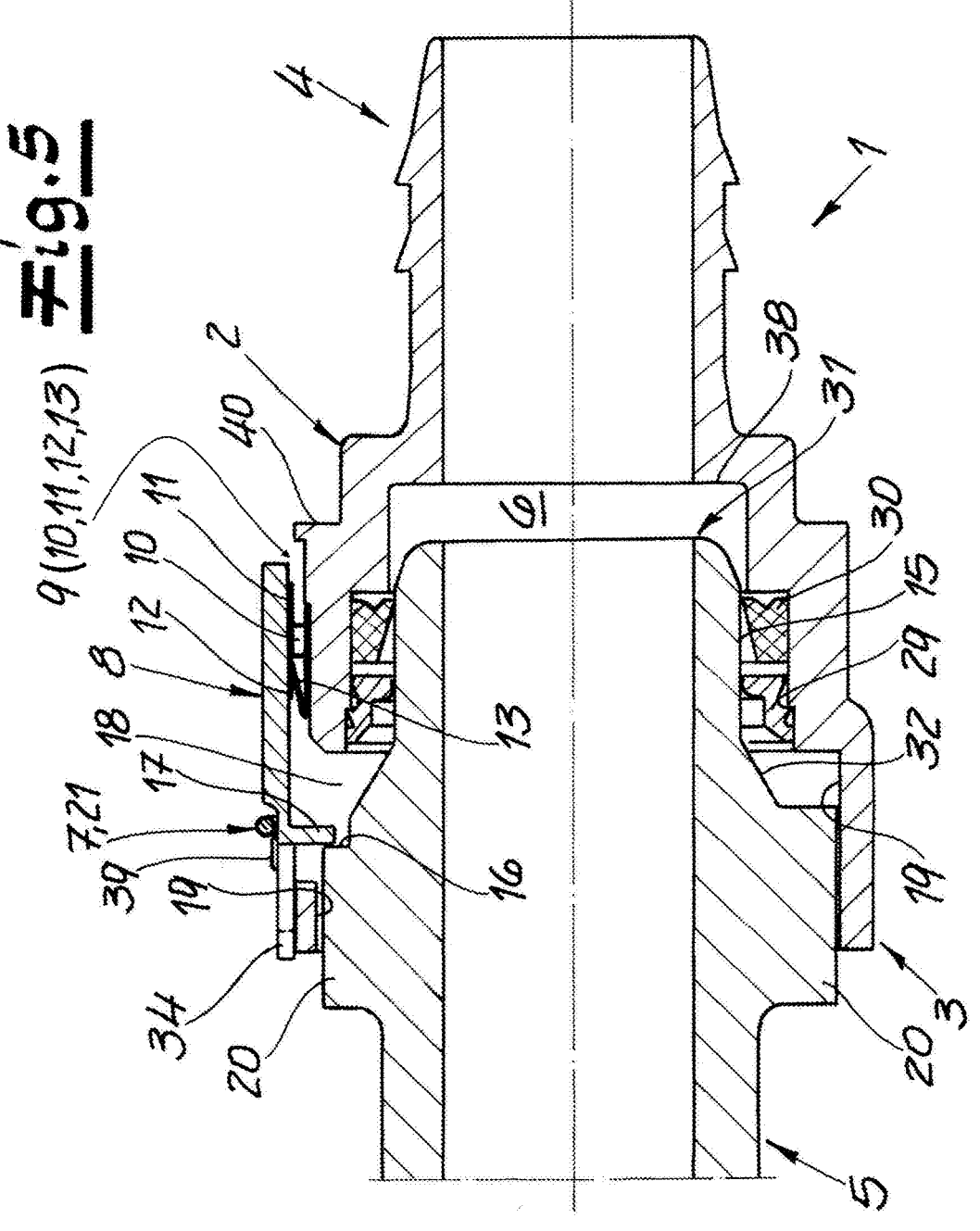
FIG. 5 is a longitudinal section through the coupling arrangement on FIG. 1, but with the coupling plug not yet latched with the coupling connector.

As made evident from a combined review of FIGS. 2 and 5, the coupling connector 1 preferably has a seal 29, 30, which preferably has a sealing switch 29 that advantageously fixes a sealing ring 30 in the connector body 2. The seal holder 29 expediently borders the coupling section 3. By contrast, the connecting section 4 can be defined as an overlapping section between the connector body 2 and a pipe not depicted here. The coupling section 3 and the connecting section 4 are expediently fluidically connected with each other via an inner channel 6, and can include a middle section of the connector body 2 in an axial direction. In particular, the middle section comprises the seal holder 29, the sealing ring 30 along with a shoulder 38 of the connector body 2, see FIG. 5.

The coupling plug 5 on FIG. 3 preferably comprises a plug opening 31, the exterior side of which preferably expands in a rounded manner in an axially inward direction. In a further axially inward direction, the coupling plug 5 preferably comprises a sealing surface 15, a spreading surface 32, a locking element 14 and/or at least one securing part 20. In this exemplary embodiment, the coupling plug 5 comprises two securing parts 20, which advantageously lie diametrically opposite each other in the circumferential direction.

It is preferred that the spreading surface 32 expand in an axially inward direction, in particular conically, so that the latching arms 22 of the retainer 7 are spread apart during the introduction of the coupling plug 5, and reset energy is stored in the retainer 7. If the coupling plug 5 is completely inserted, the latching arms 22 reach the groovelike locking element 14, and latch into them. The sealing surface 15 is preferably cylindrical in design, and expediently dimensioned in such a way as to enter into a fluid-tight frictional connection with the sealing ring 30 of the coupling connector 1. It is especially preferred that the coupling plug 5 have an actuating element 16. In this exemplary embodiment, the actuating element 16 is designed as a front face of one of the two securing parts 20. The securing parts 20 are preferably designed as springlike elements, which expediently engage into the groovelike securing elements 19 of the connector body 2.

Figure 4A:
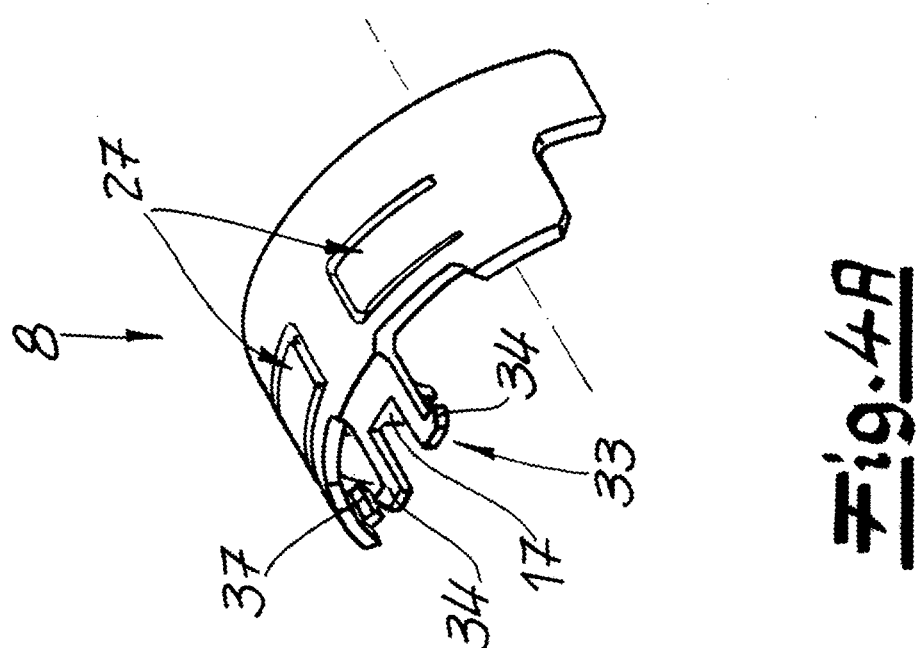
FIG. 4A is a perspective exterior view of the verifier on FIG. 1.

According to FIG. 4A, the verifier 8 in this exemplary embodiment preferably comprises an actuating section 17, which especially preferably interacts with the actuating element 16 of the coupling plug. This will be covered in even more detail on the following FIGS. 5 to 7. The verifier 8 advantageously has at least one position part 27, and preferably two position parts 27. The verifier 8 expediently comprises at least one guide element 37, and preferably at least two guide elements 37. The second guide element 37 is not visible on FIG. 4A by virtue of the selected perspective. The verifier 8 can have a stopper 33, which advantageously comprises at least one stopper hook 34 and preferably two stopper hooks 34.

The interior side of the verifier 8 can be discerned on FIG. 4B. As a consequence, the position parts 27 in this exemplary embodiment are designed as spring-elastic elements. The at least one position part 27 preferably comprises a spring arm 36, which expediently is formed by a partially circumferential, for example U-shaped, slit in a wall of the verifier 8. Each position part 27 can have a projection 35, which in this exemplary embodiment protrudes radially inward, and can be made to engage the respective position elements 26 on FIG. 2. The second guide element 37 can also be discerned on FIG. 4B. Both guide elements 37 advantageously protrude radially inward, so that they can engage into the complementary guide parts 28 of the connector body on FIG. 2, and in this way define the axial movability of the verifier 8 on the connector body 2.

It is preferred that the verifier comprise a chip 10, an antenna 11, and/or at least one switching contact 12. The elements 10, 11, 12 in this exemplary embodiment together with the closer 13 of the connector body 2 are component parts of a transmitter 9. The chip 10, the switching contacts 12 as well as the closer 13 expediently form a switching circuit 10, 12, 13. It is advantageous that the chip 10 be an RFID chip, so that the transmitter 9 is an RFID transmitter. The chip 10 is expediently connected with the antenna 11, which responds to RFID readers in a known manner. It is preferred that the chip 10 be electrically connected with two switching contacts 12 in the form of oblong contact strips. The antenna 11 is expediently arranged in an axially inward half of the verifier 8. It is possible that the chip 10 be located in an axially inward half of the verifier 8. It is preferred that the chip 10 be designed to detect whether the two switching contacts 12 are electrically connected with each other or not. It is especially preferred that the chip 10 be designed to store the connection state between the two switching contacts 12, and disclose it in a communication with a reader.

Figure 6:
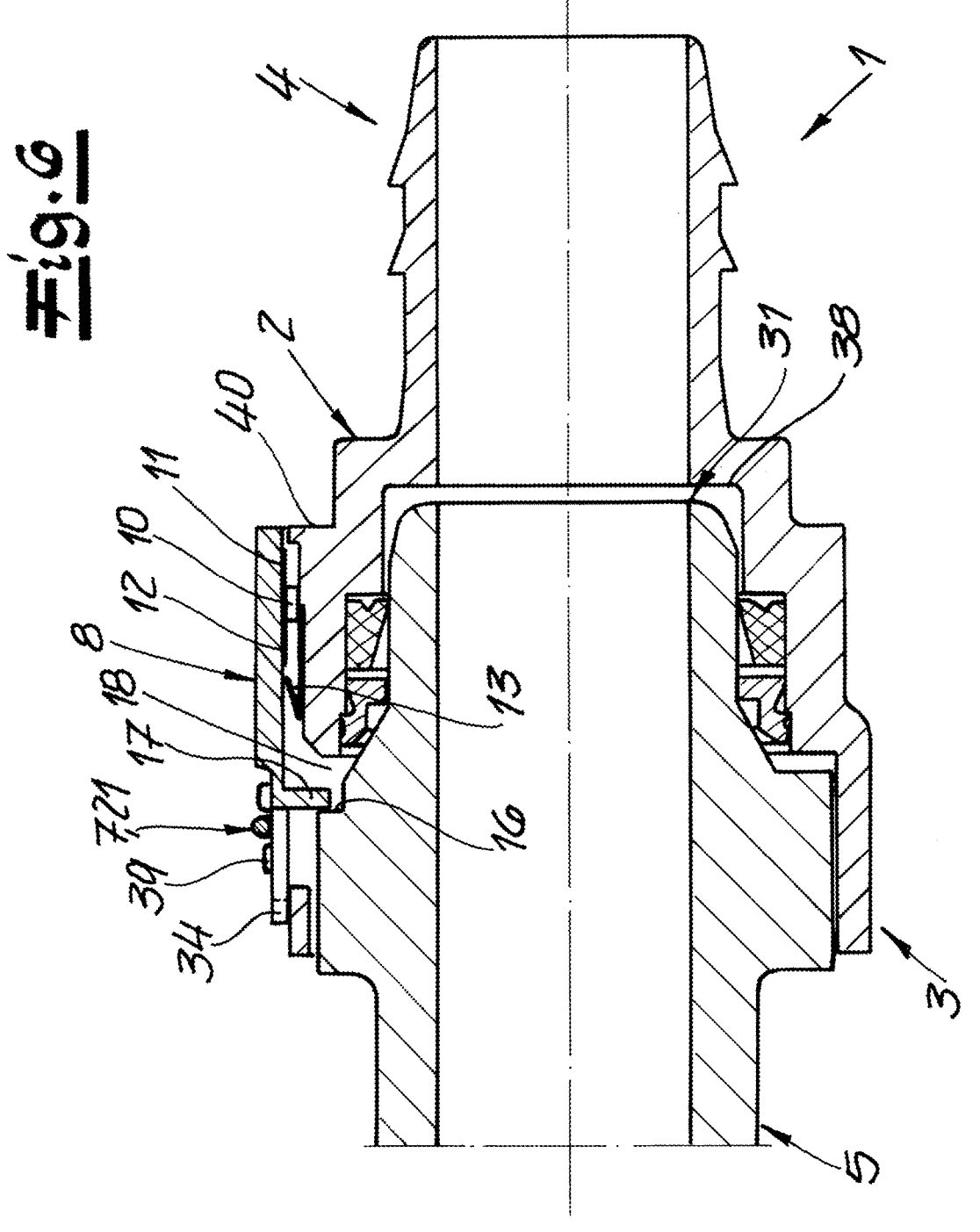
FIG. 6 is a longitudinal section of the coupling arrangement on FIG. 5 in a now latched state.
Figure 7:
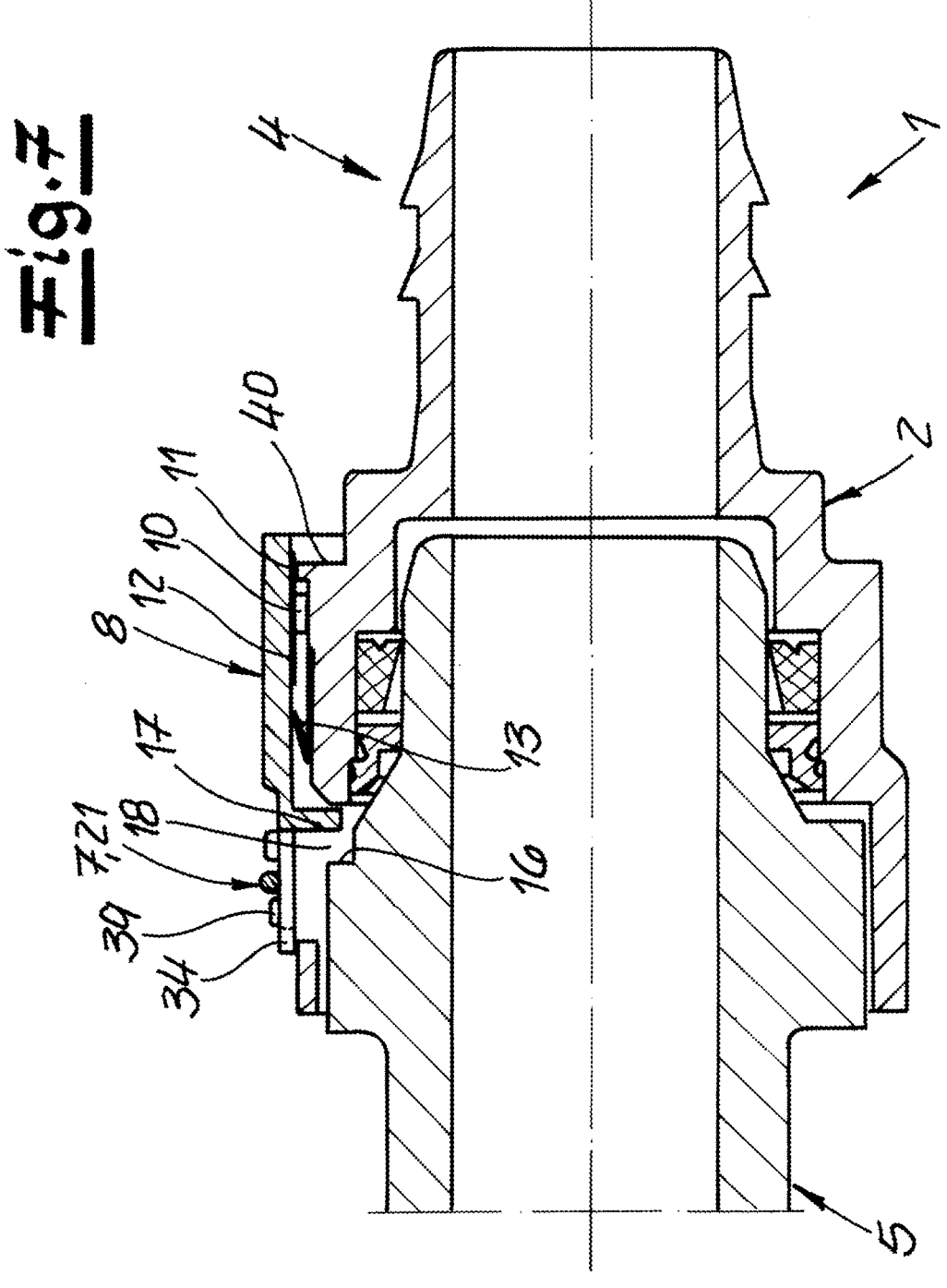
FIG. 7 is the latched state of the coupling arrangement on FIG. 6, wherein the verifier is shown in a third position located further axially inward.

FIGS. 5 to 7 show the connection process between the coupling plug 5 and the coupling connector 1. FIG. 5 depicts the point in time of the connection process at which the actuating element 16 of the coupling plug 5 first touches the actuating section 17 of the verifier 8 inside of the actuating recess 18. At this point in time, the sealing surface 15 has already reached the sealing ring 30, and thereby created a fluidically tight connection between the coupling plug 5 and the coupling connector 1. However, the locking element 14, which in this exemplary embodiment is located at the height of the actuating element 16, has not yet reached the retainer 7. This is made evident in particular by the fact that the actuating element 16 is not yet at same axial height as the handling section 21. As a consequence, the coupling plug 5 is not yet locked in the coupling connector 1 in the state of the connection process shown on FIG. 5. This circumstance can also be discerned from the fact that a somewhat larger gap is still located between the shoulder 38 of the connector body 2 and the plug opening 31 of the coupling plug 5.

At the point in time of the connection process shown on FIG. 5, the closer 13 and the two switching contacts 12 are still electrically connected with each other. As a consequence, a reader would at this point in time acquire the "electrically connected" state, and conclude from this that the coupling plug 5 has not yet been locked into the coupling connector 1. In the state shown on FIG. 5, the verifier 8 is located in the most axially outward position relative to the connector body 2. This is evident in particular from the position of the stopper hook 34 relative to the stop 39 in the flange lying axially further outward.

FIG. 6 shows a connection state between the coupling plug 5 and coupling connector 1, in which the coupling plug 5 is held locked in the connector body 2. This can be discerned from the fact that the actuating element 16, and hence the locking element 14 located at the same height, are located at the same axial height as the retainer 7. In addition, the distance between the plug opening 31 and the shoulder

38 has become clearly smaller, so that only some play still remains between these two elements. As a consequence, the actuating element 16 has displaced the actuating section 17 in an axially inward direction relative to the connector body 2 inside of the actuating recess 18.

In this exemplary embodiment, the two projections 35 of the position parts 27 of the verifier 8 are now located in the respective middle position element 26 of the connector body 2 in the state shown on FIG. 6. This movement displaced the chip 10, the antenna 11 and in particular the two switching contacts 12 in an axially inward direction relative to the closer 13, so that the switching contacts 12 and the closer 13 are no longer in electrical contact with each other. As a result, the switching circuit 10, 12, 13 was opened, wherein the chip 10 preferably registers and stores this electrical change in state. While reading the chip 10, a reader would conclude that the coupling plug 5 is being held locked in the coupling connector 1.

In addition, the verifier 8 in this exemplary embodiment also makes it possible to optically indicate the connection state. The stopper hooks 34 of the stopper 33 of the verifier 8 on FIG. 5 closes roughly flush with the connector body 2 at the axially outward end of the coupling connector 1, which is no longer the case on FIG. 6. Instead, the axially inward end of the verifier 8 on FIG. 6 closes roughly flush with a step 40 of the connector body 2.

FIG. 7 shows a third state of the verifier 8. As a consequence, the projections 35 of the verifier 8 are now located at the position elements 26 of the connector body 2 lying the most axially inward. This position is not achieved via the still tightly locked coupling plug 5, but rather via a manual actuation of the verifier 8. This produces a gap between the actuating element 16 of the coupling plug 5 and the actuating section 17 of the verifier inside of the actuating recess 18. In this exemplary embodiment, the actuating element 17 instead now hits against a front face of the actuating recess 18.

In addition, the distance between the closer 13 and the two switching contacts 12 was increased even further in the state shown on FIG. 7, while the stopper hooks 34 now hit against the stop 39 or against the stops 39, thereby marking the position of the verifier 8 lying axially the most inward. This state is also depicted on FIG. 1. As may further be discerned on FIG. 7, the axially inward end of the verifier 8 now protrudes in an axially inward direction in relation to the step 40 of the connector body 2.

The purpose of the third position element 26 lying axially the most inward is to haptically indicate the connection state. This is because, while the verifier 8 can be manually moved from the position shown on FIG. 7 into the position shown on FIG. 6, and is thus haptically tangible, this does not apply during a continued transfer from the position on FIG. 6 into the one on FIG. 5. By displacing the verifier 8, the user does notice that it can switch back and forth between the positions of the verifier 8 on FIGS. 7 and 6, but this does not hold true for the state on FIG. 5. Therefore, the user cannot displace the verifier 8 axially outward to the point where the stopper hooks 34 reach the axially outward end, and thus the coupling opening 24 of the connector body 2. Based upon this difference, the user can be assured that they have not exerted too little force for displacing the verifier 8. Instead, they know based upon the manually possible displacement between the positions on FIGS. 6 and 7 that they have indeed exerted enough force, and that the position of the verifier on FIG. 5 can intentionally very obviously no longer be reached due to the locking of the coupling plug 5. As a result, the coupling arrangement 1, 5 provides the optical, haptic and electronic indication of the connection state between the coupling plug 5 and the coupling connector 1.

| REFERENCE LIST | |
|---|---|
| 1 | Coupling connector |
| 2 | Connector body |
| 3 | Coupling section |
| 4 | Connecting section |
| 5 | Coupling plug |
| 6 | Inner channel |
| 7 | Retainer |
| 8 | Verifier |
| 9 | Transmitter |
| 10 | Chip |
| 11 | Antenna |
| 12 | Switching contacts |
| 13 | Closer |
| 14 | Locking element of 5 |
| 15 | Sealing surface of 5 |
| 16 | Actuating element of 5 |
| 17 | Actuating section of 8 |
| 18 | Actuating recess of 2 |
| 19 | Securing element of 2 |
| 20 | Securing part of 5 |
| 21 | Handling section of 7 |
| 22 | Latching arm of 7 |
| 23 | Latching arm window of 2 |
| 24 | Coupling opening of 2 |
| 25 | Closer receptacle |
| 26 | Position element of 2 |
| 27 | Position part of 8 |
| 28 | Guide part of 2 for 8 |
| 29 | Seal holder of 1 |
| 30 | Sealing ring of 1 |
| 31 | Plug opening of 5 |
| 32 | Spreading surface of 5 |
| 33 | Stopper of 8 |
| 34 | Stopper hook of 8 |
| 35 | Projection of 27 |
| 36 | Spring arm of 27 |
| 37 | Guide element of 8 |
| 38 | Shoulder of 2 |
| 39 | Stop of 2 for 33 |
| 40 | Step of 2 |
| 10, 12 13 | Switching circuit |

What is claimed is:

1. A coupling connector for automatedly acquiring the coupling state, comprising a connector body with a coupling section and a connecting section, wherein the coupling section is designed to be reversibly detachably connected with a complementary coupling plug, wherein the connecting section is designed to become or be connected with a pipe or aggregate, wherein the coupling section and the connecting section are fluidically connected with each other via an inner channel, wherein the coupling connector comprises a retainer for locking the coupling plug in the connector body, wherein the retainer is movably mounted on the connector body, wherein the coupling connector has a verifier for indicating a connection state between the coupling connector and the coupling plug, wherein the verifier is movably mounted on the connector body, and indicates the connection state via the verifier's position relative to the connector body, wherein the verifier is axially movably mounted on the connector body in a connection state of the coupling connector not connected with the coupling plug, wherein the coupling connector has a transmitter for transmitting a transmit signal, wherein the transmitter is designed in such a way that the transmit signal can transmit the connection state, wherein the transmitter comprises a chip, an antenna as well as a switch, wherein the switch has at least one switching contact as well as a closer, wherein the chip, the at least one switching contact and the closer are components of a switching circuit, wherein the closer has a movable, spring-elastic, design, wherein the switching circuit is in an open or in a closed state depending on the position of the closer relative to the at least one switching contact, wherein the coupling connector is designed in such a way that the state of the switching circuit is changed during insertion of the coupling plug into the connector body, wherein the transmitter is designed in such a way that the changed state can be stored in the chip and retrieved by a reader via the transmit signal, and wherein the chip and/or the antenna and/or the at least one switching contact is/are arranged on the verifier.

2. The coupling connector according to claim 1, wherein the retainer and the verifier are separately designed parts, and have different directions of movement during displacement on the connector body.

3. The coupling connector according to claim 1, wherein the at least one switching contact and/or the chip and/or the antenna is/are arranged or fastened on a side of the verifier that faces the connector body.

4. The coupling connector according to claim 1, wherein the verifier is predominantly arranged on an exterior side of the connector body.

5. The coupling connector according to claim 1, wherein the verifier can assume at least two, defined positions relative to the connector body.

6. The coupling connector according to claim 1, wherein the verifier comprises an actuating section, wherein the coupling connector or the verifier is/are designed in such a way that the coupling plug touches the actuating section during insertion into the connector body.

7. The coupling connector according to claim 1, wherein the connector body has an actuating recess in the form of a groove passing radially through a wall of the connector body or a window, so that the actuating section protrudes through the wall of the connector body.

8. The coupling connector according to claim 1, wherein the coupling connector is designed in such a way that the coupling plug transfers the verifier from an axially outward position into an axially inward position during an insertion into the connector body.

9. The coupling connector according to claim 1, wherein the connector body has at least one securing element to secure the coupling plug against twisting in the connector body.

10. The coupling connector according to claim 1, wherein the retainer has an essentially U-shaped in design, and can be inserted into the connector body in a radial direction.

11. The coupling connector according to claim 1, wherein the switch comprises two switching contacts.

12. The coupling connector according to claim 1, wherein the verifier, at least partially or completely, covers the closer in at least one axial position or in all axial positions.

13. A method for connecting a coupling connector according to claim 1, and a coupling plug that is configured to be inserted into the coupling connector, comprising inserting the coupling plug into the connector body such that an actuating element of the coupling plug hits against an actuating section of the verifier during the insertion of the coupling plug into the connector body, so that the verifier is displaced axially inward relative to the connector body during a continued insertion of the coupling plug to move the closer of the switch.

14. A coupling connector for automatedly acquiring the coupling state, comprising a connector body with a coupling section and a connecting section, wherein the coupling section is designed to be reversibly detachably connected with a complementary coupling plug, wherein the connecting section is designed to become or be connected with a pipe or aggregate, wherein the coupling section and the connecting section are fluidically connected with each other via an inner channel, wherein the coupling connector comprises a retainer for locking the coupling plug in the connector body, wherein the retainer is movably mounted on the connector body, wherein the coupling connector has a verifier for indicating a connection state between the coupling connector and the coupling plug, wherein the verifier is movably mounted on the connector body, and indicates the connection state via the verifier's position relative to the connector body, wherein the verifier is axially movably mounted on the connector body in a connection state of the coupling connector not connected with the coupling plug, wherein the coupling connector has a transmitter for transmitting a transmit signal, wherein the transmitter is designed in such a way that the transmit signal can transmit the connection state, wherein the transmitter comprises a chip, an antenna as well as a switch, wherein the switch comprises two switching contacts as well as a closer, wherein the chip, the two switching contacts and the closer are components of a switching circuit, wherein the switching circuit is in an open or in a closed state depending on the position of the closer relative to the two switching contacts, wherein the coupling connector is designed in such a way that the state of the switching circuit is changed during insertion of the coupling plug into the connector body, wherein the transmitter is designed in such a way that the changed state can be stored in the chip and retrieved by a reader via the transmit signal, and wherein the chip and/or the antenna and/or the two switching contacts is/are arranged on the verifier.

15. The coupling connector according to claim 14, wherein the closer has a movable, spring-elastic, design.

16. The coupling connector according to claim 14, wherein the retainer and the verifier are separately designed parts, and have different directions of movement during displacement on the connector body.

17. The coupling connector according to claim 14, wherein the verifier, at least partially or completely, covers the closer in at least one axial position or in all axial positions.

18. A coupling connector for automatedly acquiring the coupling state, comprising a connector body with a coupling section and a connecting section, wherein the coupling section is designed to be reversibly detachably connected with a complementary coupling plug, wherein the connecting section is designed to become or be connected with a pipe or aggregate, wherein the coupling section and the connecting section are fluidically connected with each other via an inner channel, wherein the coupling connector comprises a retainer for locking the coupling plug in the connector body, wherein the retainer is movably mounted on the connector body, wherein the coupling connector has a verifier for indicating a connection state between the coupling connector and the coupling plug, wherein the verifier is movably mounted on the connector body, and indicates the connection state via the verifier's position relative to the connector body, wherein the verifier is axially movably mounted on the connector body in a connection state of the coupling connector not connected with the coupling plug, wherein the verifier, at least partially or completely, covers the closer in at least one axial position or in all axial positions, wherein the coupling connector has a transmitter for transmitting a transmit signal, wherein the transmitter is designed in such a way that the transmit signal can transmit the connection state, wherein the transmitter comprises a chip, an antenna as well as a switch, wherein the switch has at least one switching contact as well as a closer, wherein the chip, the at least one switching contact and the closer are components of a switching circuit, wherein the switching circuit is in an open or in a closed state depending on the position of the closer relative to the at least one switching contact, wherein the coupling connector is designed in such a way that the state of the switching circuit is changed during insertion of the coupling plug into the connector body, wherein the transmitter is designed in such a way that the changed state can be stored in the chip and retrieved by a reader via the transmit signal, and wherein the chip and/or the antenna and/or the at least one switching contact is/are arranged on the verifier.

19. The coupling connector according to claim 18, wherein the closer is has a movable, spring-elastic, design.

20. The coupling connector according to claim 18, wherein the switch comprises two switching contacts.

* * * * *